July 4, 1967  L. A. HADDOCK  3,329,292
LATERALLY MOVABLE PLATFORM FOR A LIFT TRUCK
Filed March 11, 1965  5 Sheets-Sheet 3
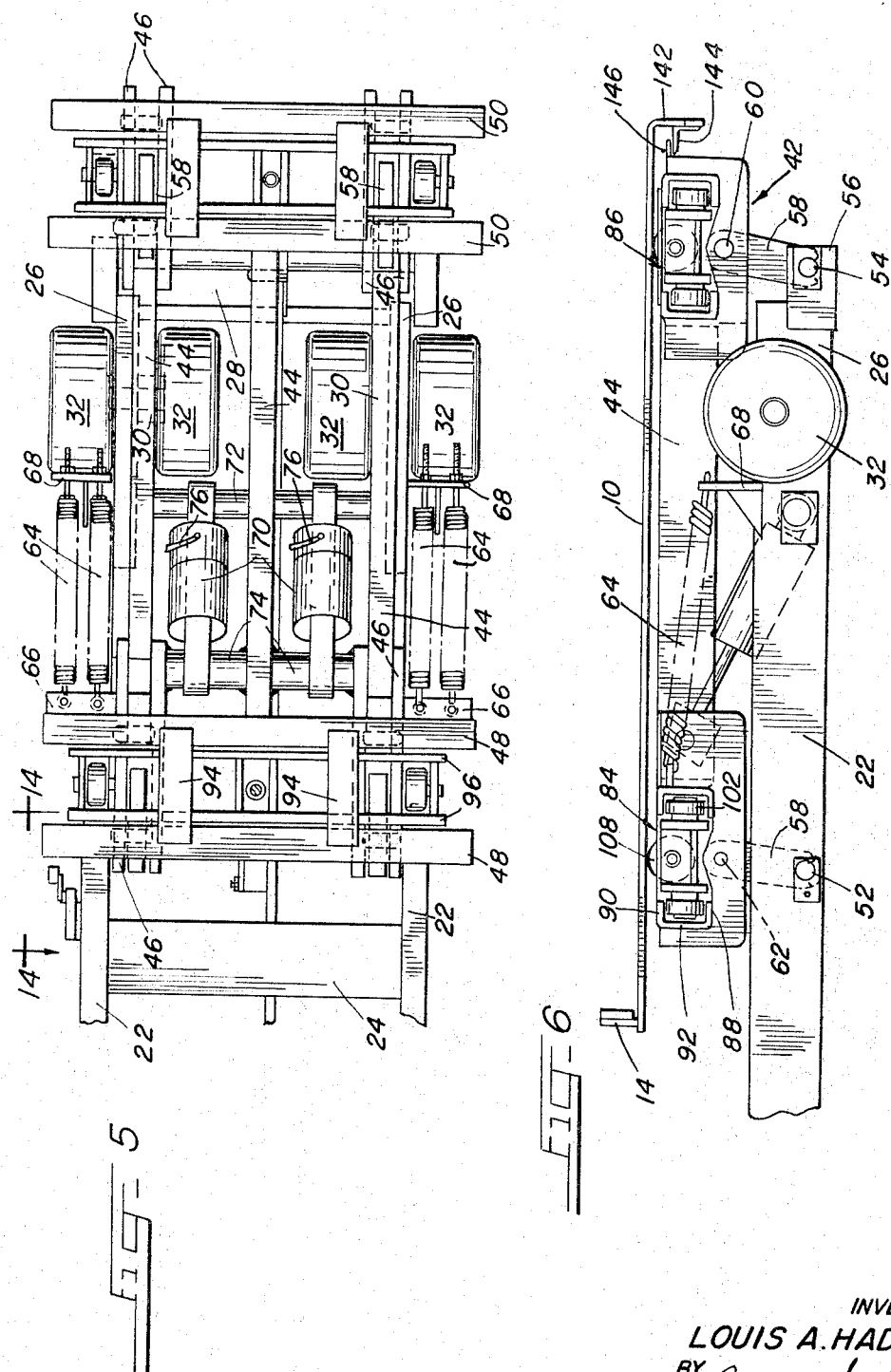
INVENTOR.
LOUIS A. HADDOCK
BY Brown, Jackson,
Boettcher & Dienner
ATTYS.

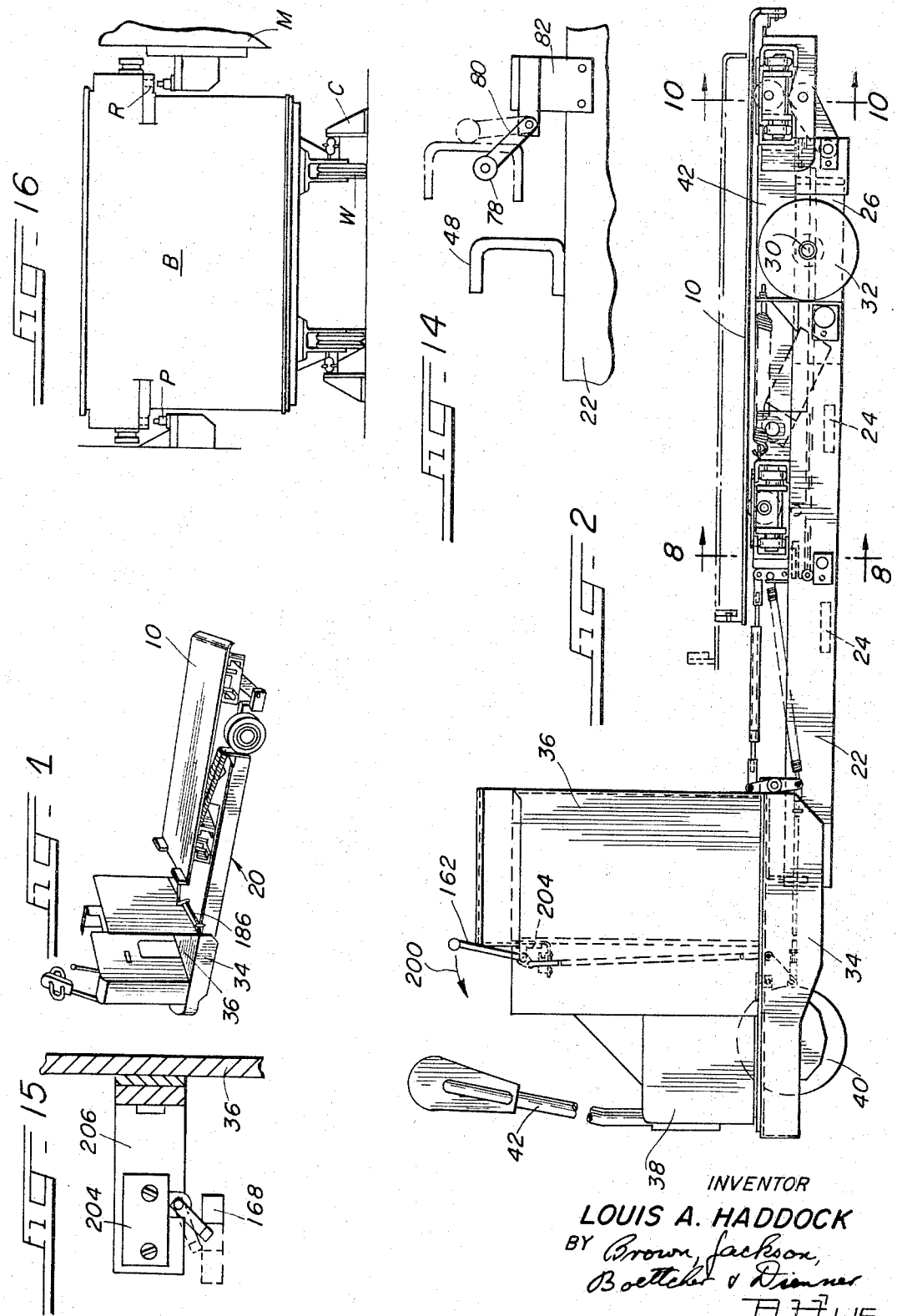

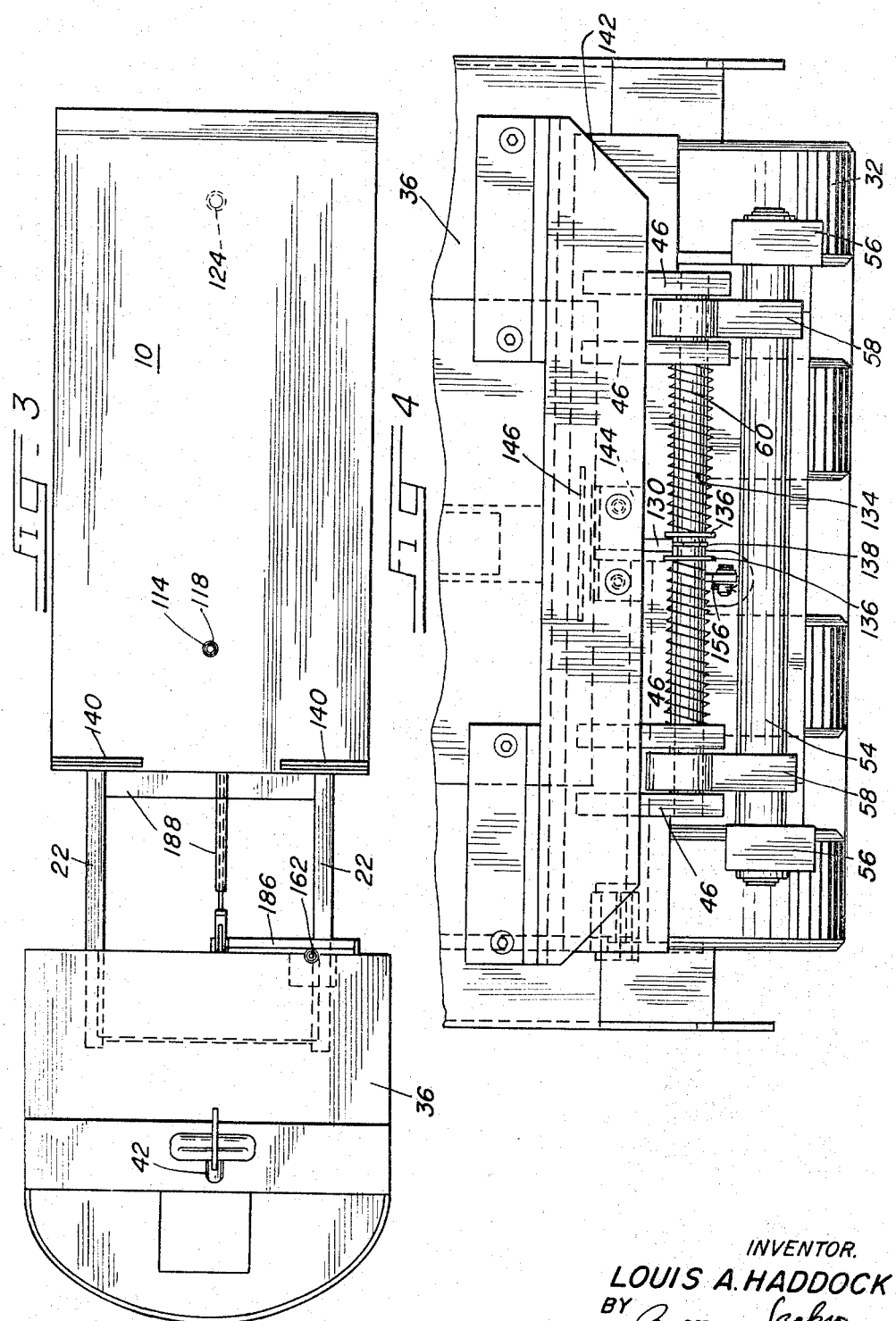

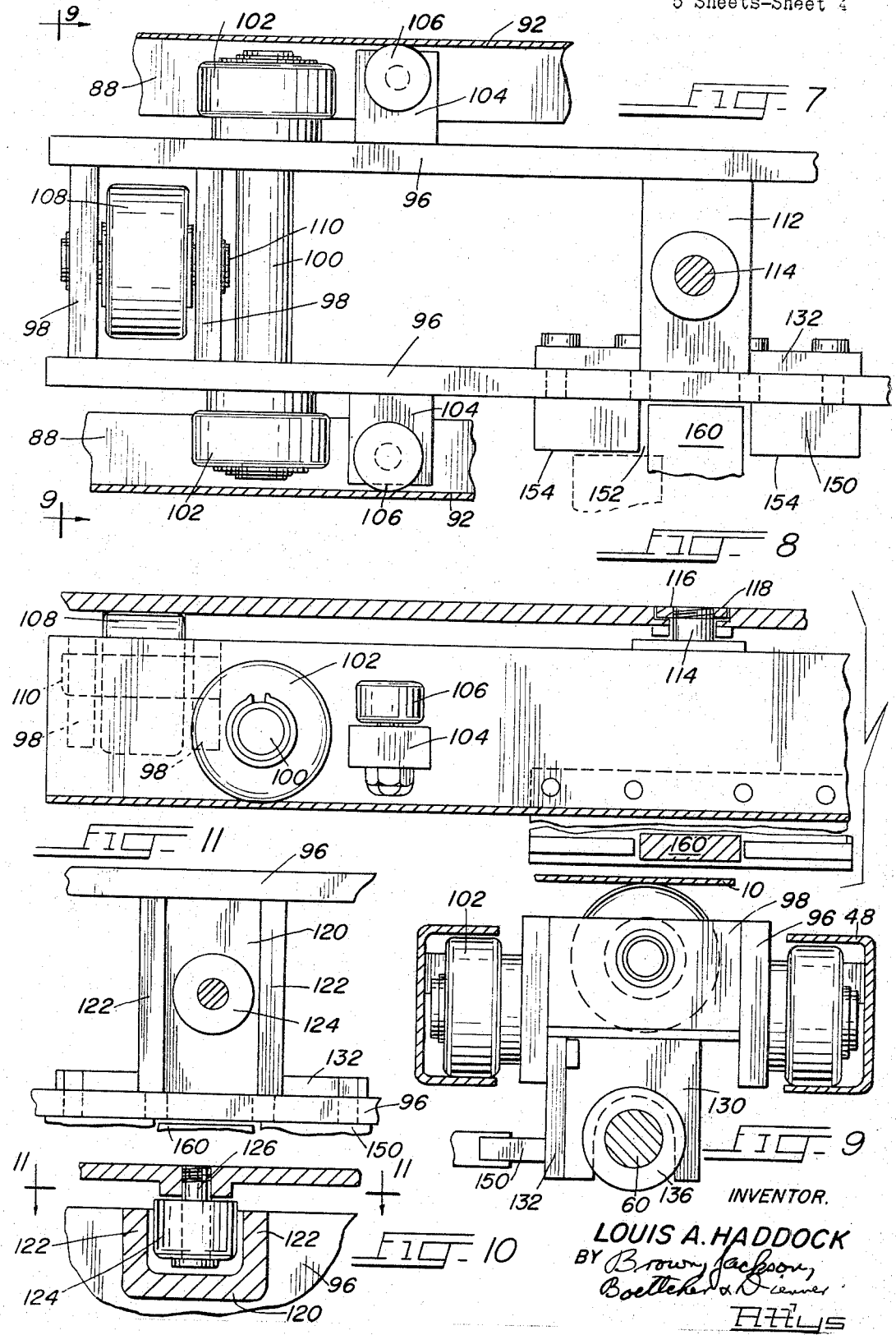

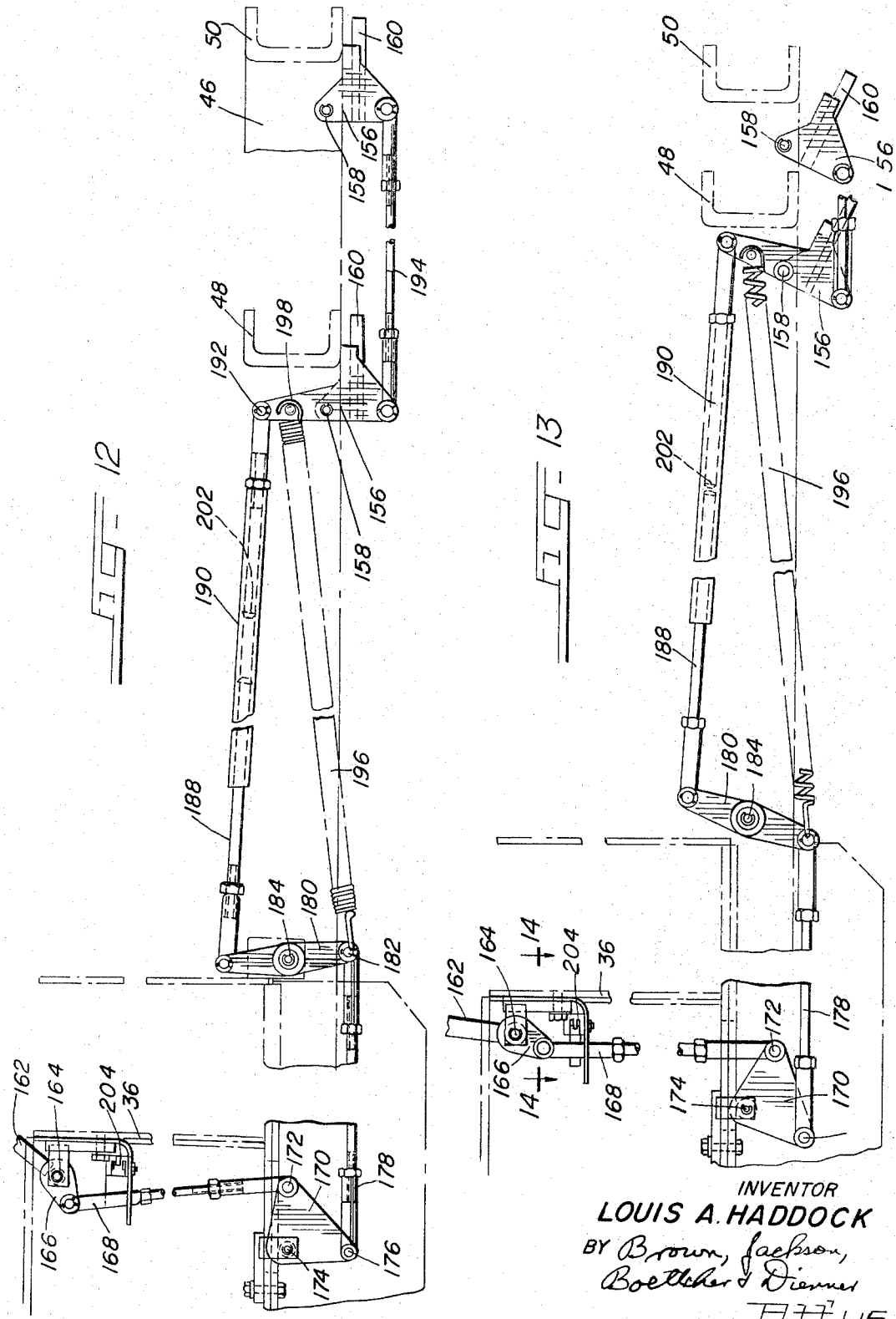

United States Patent Office 3,329,292
Patented July 4, 1967

3,329,292
LATERALLY MOVABLE PLATFORM FOR A LIFT TRUCK
Louis A. Haddock, Battle Creek, Mich., assignor to Clark Equipment Company, a corporation of Michigan
Filed Mar. 11, 1965, Ser. No. 439,046
9 Claims. (Cl. 214—730)

This invention relates to platform lift trucks or other vehicles having an elevatable load carrying platform.

The principal object of the invention is to provide a vehicle or truck having an elevatable platform which is adapted to accommodate limited transverse and skewing movement of the platform relative to its mounting on the vehicle so as to eliminate the necessity for precise operator alignment of the vehicle to load and unload its platform.

In accordance with said object, a feature of the invention is that a truck or other mobile vehicle is provided with an elevatable frame mounted on the supporting bed or main frame of the vehicle so as to be raised and lowered relative thereto. This elevatable frame has forward and rearward located transversely extending channels or guideways in which are slidably supported a pair of carriages for transverse reciprocal movement relative to the direction in which the vehicle is propelled or is moveable. The load platform in turn is pivotally connected centrally of one of said carriages and to the other carriage by a roller which travels within a longitudinal extending channel provided in the other carriage whereby the load platform can move both laterally of the elevatable frame with movement of said carriages and can also skew on its connections to said carriages.

It is also a feature of the invention that resilient means are provided which counter said lateral movement of the carriages so that the platform is self-centering as well as free for limited transverse and skewing movements.

A further feature of the invention is that each said carriage is provided a pair of freely rotatable rollers on which rests the platform providing spaced line contact therefor, said rollers turning on horizontal axes disposed parallel to each other and to the reciprocal movement of the carriages so as to accommodate skewing of the platform while heavily loaded.

Still another feature of the invention is the provision of operator-controlled locking means by which the platform may be locked in its centered position so as to be held against said transverse or laterally-directed and skewing movements, as when it is desired to move the loaded vehicle from one location to another.

Another feature of the invention is the novel arrangement provided by means of which operator control may be exercised over the locking means both at the raised and lowered positions of the platform.

Still another feature is the interlocking of the controls for the elevating mechanism with the operator controls for the locking means so that the platform cannot be lowered unless the controls are in position to effect locking of the platform.

Another object of the invention is to provide a lift truck or other mobile vehicle having such motility of its load carrying platform and which is also of rugged durable construction and is also of a construction which is sufficiently simple and economical to manufacture and practical to use.

Many other objects, advantages and/or features of the invention will be at once evident or will become so upon consideration of the hereinafter illustrated and described embodiment of the invention.

Referring therefore now to the drawings,

FIGURE 1 is a perspective view of a vehicle employing the invention;

FIGURE 2 is a side elevational view thereof with cooperating elements shown in dotted lines to designate their related positions;

FIGURE 3 is a top plan view thereof;

FIGURE 4 is a rear end view thereof;

FIGURE 5 is a top plan view of the platform carrying frame, the load carrying platform being removed for clarity of illustration;

FIGURE 6 is a fragmented side elevational view corresponding to FIGURE 2 and showing the elevatable frame and platform carried thereby in their elevated position;

FIGURE 7 is a fragmented sectional view taken along lines 7—7 of FIGURE 2 and show details in the construction of the forward carriage and its associate guideways;

FIGURE 8 is a vertical sectional view taken along line 8—8 of FIGURE 2 to show further details of the carriage; this view being through the forward carriage;

FIGURE 9 is a vertical sectional view taken along lines 9—9 of FIGURE 7 looking in the direction indicated by the arrows;

FIGURE 10 is a vertical sectional view taken through the rearward carriage along lines 10—10 of FIGURE 2;

FIGURE 11 is a fragmented top plan view taken along lines 11—11 of FIGURE 10;

FIGURE 12 is a view of the linkage arrangement for operator control of the locking means; the same being shown in locked or closed position;

FIGURE 13 is a view generally similar to FIGURE 12 but showing the locking means in unlocked or open position;

FIGURE 14 is a fragmented sectional view of the limit switch for regulating the elevating means at its upper or elevated position, the views being taken along lines 14—14 of FIGURE 5;

FIGURE 15 is a fragmented view illustrating the operation of the microswitch which interlocks the electrical lifting and lowering circuit to the operation of the lever controlling the carriage movements lock and is taken along lines 15—15 of FIGURE 13; and FIGURE 16 is a schematic view of a mixing machine having a bowl with which the invention has particular utility in a loading and/or unloading operation.

Referring now more specifically to the several views, a self-propelled mobile vehicle or truck having an elevatable platform which is also adapted for lateral and skewing movements is illustrated in FIGURE 1. Considering now FIGURES 2–6 in conjunction therewith such a vehicle in accordance with the invention comprises a low slung main supporting frame 20 consisting of a pair of longitudinally extending rugged side members 22 joined together into a rigid frame structure by a plurality of spaced laterally extending braces 24. At the rear end of said main frame are parallel-disposed axle supporting members 26 welded to the inner side of members 22 and joined by an end-located cross brace 28 into a rugged axle supporting frame. Extending through members 26 are a pair of aligned horizontal axles 30, which support heavy-duty wheels 32 for free rotation through parallel vertical planes. Preferably said wheels are equipped with solid urethane tires.

Welded or otherwise affixed to the forward end of the side presses 22 of the main frame 20 is an extension indicated generally at 34 which includes a partially-enclosed operator standing area or booth 36. Forwardly of said booth, the floor of extension 34 contains a rotatable plate (not shown) on which is supported a prime 38 adapted to turn a centrally disposed drive wheel 40 also mounted on the underside of said rotatable plate. Prime mover 38 may be of any conventional construction. For example, it may be a battery operated motor geared to effect rotation of wheels 40 and controlled through steering column 42. This column 42 may be adapted to be pulled toward the operator to brake the motor 38 to reduce the speed at which the vehicle is propelled and pushed away from the operator to increase its speed. It is also adapted to turn wheel 40 by being moved either to the right or left which effectively rotates the plate on which motor 38 and wheel 40 are supported. The construction and operation of motor 38 to drive wheel 40 and its control mechanism is of conventional construction and well known to those skilled in the art. It forms no part of the present invention beyond the fact that the invention contemplates a mobile low slung main body on which the elevtable platform 10 is supported and which is also preferably self propelled although it may be merely wheel supported and adapted to be pulled either manually or by a separate tractor or other vehicle.

Turning now more specifically to FIGURES 2, 5 and 6, at 42 is a platform support or frame located behind the cab 36 and which in its lower position is adapted to rest on the upper surface of the longitudinal side pieces 22 of the main supporting frame. Said elevatable frame 42 as shown best in FIGURE 5 comprises three parallel spaced beams 44 which extend longitudinally of the vehicle. The two outer beams have pairs of plates 46 welded to the opposed side surfaces of their opposed ends. These plates 46 have a cutout in their upper edge which provide seats for a forward pair of laterally extending U-channel members 48 and a rearward located pair of laterally extending U-channel members 50 which members are welded thereto. The center one of said longitudinal beams 42 is end welded to the inner one of channel members 48 and 50 to produce a rigid and strong supporting frame. The U-shaped channels 48 and 50 also constitute guideways for carriages on which platform 10 is mounted as will be hereinafter described.

Considering now FIGURE 4 with FIGURES 5 and 6, elevatable frame 42 is connected to the main body frame 20 as follows. At 52 is a spindle having its ends rotatably journalled in side members 22 of the main frame adjacent the forward ends thereof. At 54 is a second spindle disposed parallel to spindle 52 and rotatably journaled in lugs 56 welded to the rear ends of axle supporting members 26 of the main frame. Each said spindles 52 and 54 have a pair of arms 58 which are rigidly secured to said spindles at one end as by weldments and have their opposite or upper ends pivotally connected to a respective one of a rearward located and a forward located spindle 60 and 62 (FIGURE 6) which have their ends extending through provided openings in channel supporting plates 46. Said spindles 60 and 62 are respectively centered beneath the pairs of U-channel members 48 and 50 and welded to said plates in parallel relation. At 64 are two sets of coil springs, two being located on each side of the platform support 40; one end of each said springs 64 being connected to one of a pair brackets 66 welded to the adjacent ends of the inner one of U-channel 48 of the platform support 42 and their other end to one of a pair of brackets 68 similarly welded or otherwise rigidly fixed to side pieces 22 of the main body frame 20. At 70 are a pair of elevating cylinders comprising telescoping parts, the lower part thereof being pivotally joined to a cross spindle 72 secured between side pieces 22 of the main body frame as by weldments and the upper part of said cylinders being similarly pivotally connected to spindles 74 rigidly connected between the longitudinal beams 44 of the elevatable frame 42 as by weldments (FIGURE 5). At 76, each said cylinder 70 is provided with a conduit connected to a suitable source of compressed air or other fluid located in any convenient location, for example forwardly of the operator booth 36 and which is operator-controlled by means not shown to permit filling of the interior of the cylinders 70 from the bottom and effect separation of their telescoping parts and thereby to move frame 42 forwardly and upwardly from a low postion on main frame 20 to an elevated postion as shown in FIGURE 6 and also indicated by phantom lines in FIGURE 2. The effect of raising frame 42 is thereby to elevate platform 10 mounted thereon as hereinafter described. It will be appreciated that said elevation of frame 42 and its supported platform 10 is against the resistance of springs 64 and their path of movement is controlled by the aforedescribed links 52 and associated spindles which effect a parallelogram movement between the platform 40 and main supporting frame 20 during the operation of the elevating cylinders both in the elevating and lowering of frame 42 so that platform 10 retains a parallel relation at all times with the supporting frame 20 of the vehicle and therefor the floor surface itself on which the vehicle moves or is at rest. Referring now to FIGURE 14 considered with FIGURE 4, at the top or upper limit of the elevation of frame 42, the adjacent vertical wall of the forward one of U-channel members 48 engages with roller 78 on operating arm 80 of a microswitch 82 affixed at an appropriate location on one of the longitudinal side members of the main frame 20. Microswitch 82 is contained in the electrical circuit which is energized by the operator to fill cylinders 70 with fluid and elevate frame 42. In the position of arm 80 indicated by full lines in FIGURE 15, microswitch 82 is closed. However, when engaged by member 48 and moved to the position indicated by phantom lines, the microswitch 82 opens to inhibit further admission of fluid to cylinders 70 but maintaining the pressure level therein so that the platform 10 will be held at its elevated position and will support the weight of any load thereon. When it desired to lower the frame 42 and its platform 10, the operator energizes a further circuit which allows the pressurized fluid to escape from cylinders into the atmosphere of air or to a provided resevoir if another type of fluid is used. As the fluid leaves cylinders 70, the weight of the loaded platform and springs 64 return frame 42 and platform 10 to its lowered position against frame 20.

As previously mentioned, platform 10 is mounted on elevatable frame 40 so that it may both move laterally thereof to either side of a center line of the vehicle and also skew within limited amounts. The means by which this is obtained will now be described. Referring therefore now to FIGURES 5, and 6, the previously-identified forward located and rearward located pairs of U-shaped members 48 and 50 constitute guide ways in which a forward-located carriage 84 and a rearward located carriage 86 are located for sliding movement laterally of elevating frame 42, and to which carriages 84, 86 platform 10 is connected. Each said pairs of U-shaped channel members or guideways 48, 50 are of similar construction, arrangement and function. Therefore only one pair need be specifically described. As perhaps best shown in FIG. 6, each said guide ways 48 has a generally rectangular U-shape in cross section with their open side facing the open side of the other member of the pair. Said guideways therefor include a laterally extending bottom wall 88, an opposed top wall 90 and a side wall 92 corresponding to the bight of their U-shape, and their remaining open side disposed toward the open space between two guideways. In said space between guideways 48 is the mentioned forward carriage 84 and in the corresponding space between guideways 50 is the rearward-located carriage 86. For strengthening the construction, the guideways of each pair are connected by cross braces 94.

Carriage 84 and 86 are essentially similar in construction, except in the manner in which they are connected to platform 10. Except for this manner of connection, it will therefore also suffice to describe one of such carriages and for purposes of convenience the forward located carriage 84 will now be described. Said carriage 84 comprises two longitudinal plate members 96 which are of a length essentially corresponding to the length of the U-shaped guideways 48 and have a vertical dimension essentially corresponding to the distances separating the top and bottom walls 88, 90 of the guideways. Longitudinal members 94 of the carriages lie wholly within the space separating the two associated guideways 48 and are interconnected by pairs of cross members 98 (FIG. 7) which are preferably welded to said walls 88, 90 to produce a rigid and unyielding form. Rotatably journalled in members 96 at each end of the carriages are a pair of axles 100 on the ends of which freely rotate rollers 102. Rollers 102 freely rotate through parallel vertical planes and are dimensioned as well as located so as to have running contact with the inner ends of top wall 90 and bottom wall 88 and with a minimum of vertical displacement to permit free sliding movement of the carriage 80 in directions laterally of the platform support or elevatable frame 42. Intermediate rollers 102 and also on each side of members 88, 90 of the carriages are a pair of spaced brackets 104 which rotatably support further rollers 106 adapted for free rotary movement about spaced parallel vertical axes and so as to have continuous engagement with the respective side walls 90 of the U-shaped guideways 48 (50 in the case of the rearward carriage 86) and whereby the carriages have only limited vertical and horizontal play while being free to move longitudinally of their associated guideways 48 or 50 and laterally of the platform supporting frame 42. At the two opposite ends of the carriages 84 and 86 are also supported a further pair of rollers 108 having their axles 110 supported in the aforementioned cross braces 98 which join the side members 96 of the carriages into an integral unit. Rollers 108 are free to turn on horizontal axes through vertical planes normal to the direction of movement of the carriages in the guideways 48, 50 and paralleling the longitudinal axes of the vehicle on which the platform 10 and its thus described supporting structure is mounted.

As illustrated in FIGURES 2, 6 and 11, said rollers 108 are so supported that their upper reaches extend above the uppermost extent of the side members 96 of the carriages 84 and 86, as well as the upper walls 90 and interconnecting braces 94 of the U-shaped guideways 48 and 50 with which the carriages are associated. The apexes of said rollers 108 define a common plane disposed parallel to the floor surface over which the vehicle travels and provide four areas of linear support on which the platform 10 rests.

Referring now to FIGURES 3, 5 and more particularly to FIGURES 7 and 8, the forward located carriage 84 has a center brace 112 rigidly connected to the side members thereof and on which is welded an upstanding pivot post 114 which extends through a provided opening 116 in platform 10 about which is a provided recess in which seats a nut 118 or other locking device threadedly or otherwise connected to post 114 connecting platform 10 to carriage 84 while allowing it freedom to pivot on post 114.

Referring next to FIGURES 10 and 11 in conjunction with FIGURES 3 and 5, in place of center cross brace 112, the rearward-located carriage 86 has a channel shaped brace 120 provided with parallel spaced vertical walls which extend at right angles to the direction of sliding movement of the carriage 84 on guideways 50, that is longitudinally of the platform 10 or direction in which the vehicle normally travels. Platform 10, in turn, has a roller 124 on its underside rotatably supported upon a vertical axle 126 so as to be free to turn through a horizontal plane, said roller being adapted to engage within the channel 120 and dimensioned so as to have running engagement with the opposed side walls 122 of the channel brace 120. It will therefore be apparent that platform 10 is supported at near its four corners on rollers 108 and is connected to carriages 84 ad 86 so that it must move laterally of the supporting frame 42 with movement of said carriages in their associated guideways 48 and 50. Platform 10 is also free to pivot about its connections to the two carriages so as to skew about pivot post 114 within the limited reciprocal movement permitted by rollers 124 operating within channel brace 120 as when the carriages 84 and 86 are moved in opposite directions or unequal distances along their respective guideways 48 and 50.

Said carriages 84 and 86 also have automatic centering means associated therewith by which they are retained centered on their supporting frame except when an external force acts on the platform 10 to move it laterally or skew it on its connections to the carriages. The means for automatically centering the carriages in their guideways will be best understood by referring to FIGURES 4 and 9. Although said figures show the rear carriage centering means, it is to be understood that the centering means for the forward carriage are of identical construction so that a description of the centering means for the rear carriage 86 in its guideways 50 should suffice for an understanding of this portion of the invention. Referring therefore to said FIGURES 4 and 9, each carriage includes an abutment 130 centrally of its underside and rigidly attached to one wall 96 thereof by means of a plate 132 with which the abutment 130 is an integral part. As shown in FIGURE 9, abutment 132 comprises a vertical lug having a recess in its lower edge through which spindle 60 passes. As illustrated in FIGURE 4, encircling spindle 60 are a pair of coil springs 134 which are confined between the adjacent surface of the inner one of channel supporting plates 46 in which spindle 46 is journaled and a washer 136 which is thus compressed against the adjacent side surface of abutment 130. At 138 is a retaining ring 126 which limits the movement of washers 136 under the compressive force of springs 134, as when the abutment 130 is moved away from the washer. It will therefore be apparent that any movement of carriage 86 along its guideways 50 will be resisted by the resulting increased compression of the spring 134 against which said movement reacts through abutment 130 and collar 136. Consequently when the force on the carriage is relieved, the compression of the spring will act to return the carriage to its centered relation with respect to the supporting frame 42 and the compression of the spring is relieved.

As safety precautions, platform 10 will be provided with resilient faced bumpers 140 at the forward edge thereof for engagement by the load and it will also have a depending portion 142 provided with a bracket 144 on the inner side of said depending portion 142 which engages beneath a rearwardly extending lip 146 welded to the rear side of guideway 50 to prevent undue strain on the connections of the platform 10 to the carriages, and particularly the raising of roller 124 out of its receiving channel 120 should the weight of the load be distributed unduly forward of the platform.

The ability of the platform 10 to thus move laterally of the truck body to either side of its center line as well as to skew on its pivoted connections to the carriages 84 and 86 make the vehicle so equipped particularly useful where it is necessary to accurately align the platform with a load to be taken on or with a station which is to receive the load, and without having to also exercise precise alignment of the vehicle itself. For example, the invention will have particular utility in loading and unloading the bowl of a mixing machine as illustrated by FIGURE 16 and transporting the bowl to and from loading and unloading stations.

Referring therefore to FIGURE 16, a mixing machine M is illustrated having a mixing bowl B which must be precisely aligned with supporting pivots P of the machine M, the machine having a funnel shaped entry chute with side walls C adapted to be engaged by rollers R on the bowl to assist in said alignment. Assuming the bowl 13 to have been loaded with a required mix and ready to be delivered to the mixing machine M, applicant's truck may be backed with its platform 10 in its lowered position. In its lowered position, the top of the platform will be approximately a half inch below the under surface of the bowl or just sufficient to clear the top surface of the lowered truck platform 62. After the truck has been backed so that its platform is beneath the mixing bowl, elevating cylinders 70 will be filled with fluid so as to effect elevation of the platform support 42 and the platform 10 which it supports sufficiently to raise the mixing bowl just sufficient to lift its wheel W free of the floor surface, i.e. about two inches, which means that the height through which frame 42 is elevated approximates 2½ inches over its low position. With mixing bowl resting on the raised platform 10 of the truck and its wheels W off the floor, the truck is then propelled and backed into the mixing machine M so that its rollers R engages walls of the mentioned funnel type entry chute C. Because the platform is free to move laterally with carriages 84 and 86 and also to skew on its pivotal connections with said carriages, the loaded platform is free to follow the path directed by engagement of rollers R with the walls of the chute C even though the truck may not be exactly centered therewith and may even be entering at a slight angle thereto. Once the vehicle has backed the mixing bowl B into position so that its pivot receiving recesses N align with the pivot pins P, the vehicle platform may be lowered by releasing the pressurized fluid in cylinders 70. Platform 10 thereupon lowers under the weight of the load and the action of springs 64. As platform 10 is lowered to where it is relieved of the load of mixing bowl because it is either caught on pins P of the machine or rests on its wheels W as the case may be, the compressing force on springs 134 is also released so that the platform 10 is returned to its centered position on frame 42 and the vehicle may be moved forwardly out from beneath the machine. It will be appreciated that in removing the mixing bowl from the machine a reverse operation of the lifting platform of the truck will be followed.

It will be appreciated that the mixing bowl B, when loaded with a mix is of a size that it may weigh several tons. Although spherical ball transfers might be utilized in place to support platform 10 on carriages 84 and 86 of rollers 94, I have found that rollers 108 by reason of their linear as opposed to point support provide more adequate support of such heavily loaded platforms while accommodating the necessary skewing movement of the platform. My use of rollers also has the advantage that there is no problem from dirt which tends to settle between the balls and their supporting races which cause binding. They also avoid brinelling of the platform which might occur where there is point contact between a supporting ball and a heavily loaded platform.

In transporting a load, such as bowl B when it is filled with a fluid mix it is important that the contents not be disturbed during travel of the truck to and from the mixing machine as might occur because of the described freedom of the platform to move laterally and skew. It however is a further feature of the invention that means are provided by which the platform may be locked against said lateral and skewing movements both when the platform is in its raised, and when it is in its lowered position. Referring therefore to FIGURES 7, 8 and 9, the aforedescribed attachment plates 132 by which abutments 130 were rigidly secured to the underside of carriages 84 and 86 also have a forwardly extending catch plate 150 having a latch receiving notch 152 centrally of their forward edge and an aligning surface edge 154 on each side thereof; and latch members 156 (FIGURES 12 and 13) pivotally connected at 158 to an adjacent portion of the platform support 40 are provided with a latching part 160 to seat within notch 152 when the carriage is properly centered in its guideways. With parts 160 of the latches in notches 152, carriages 84 and 86 are not free to move so that the platform 10 can neither be displaced laterally of the center line of the vehicle or skew on its pivotal connections with said carriages. Said latches may be arranged, for independent manual operation. Preferably, however, appropriate linkage means is provided whereby the two latches work conjointly and are operated controllably by the operator standing in booth 36. Said linkage and the operation thereof will now be described. Referring therefore also to FIGURES 12 and 13 and considered in conjunction with FIGURE 2, an operating lever 162 is pivotally mounted on one wall of the operator booth 36 at 164 and so as to operate bell crank 166 to the lower end of which is pivotally connected a first link 168. Link 168 in turn has its opposite end pivotally connected to one end of a bell crank 170 as at 172, the bell crank being pivotally connected to the main frame 20 at 174 remote from pivoted connection 172. Pivotably connecting bell crank 170 at a third location 176 is a further link 178 which is pivotally connected to the lower end of a third link 180 at 182. Link 180 in turn is pivotally connected intermediate its ends to the main body frame 20 behind the cab as at 184. The upper end of the link 180 is in turn pivotally linked through rod 186 (FIG. 1) to one end of link 188 which telescopically interfits with tube 190 pivotally connected at 192 to the upper end of latch 156 above its pivotal connection 158. Latch 156 in turn is pivotally connected through link 194 to latch 156' so that the two latches operate conjointly. A coil spring 196 is connected between pivotal connection 182 of lever 180 and latch 156 intermediate its pivotal connection at 158 and its upper end to which tube 190 is pivotally connected.

In the illustrated positions of the linkages and cranks shown by FIGURE 12, latches 156 and 156' have their parts 160 engaging in notch 152 of catch plate 150 on the two carriages 84 and 86, spring 196 acting on latch 156 so as to maintain its latching part 160 and the corresponding part of latch 156' through link 194 within notches 154 and so that carriage 84 and 86 cannot move. However to unlock the carriages, the operator has only to move lever 162 about its pivot 164 in a clockwise direction or away from him as indicated by arrow 200 in FIGURE 2. Thus as illustrated by FIGURE 13, the effect will be to move link 168 downwardly and inwardly toward the operator booth 36 which downward movement is transmitted through bell crank 170 to move link 178 forwardly, rocking lever 180 in a clockwise direction causing the end of rod 188 to engage abutment 202 in tube 190 and rocking latch 156 about its pivoted mounting 158 to withdraw its part 160 downwardly and away from notch 154 in catch plate 150. Since this action is also transmitted through link 194 to latch 156', the result is to unlock and therefore free the two carriages 84 and 86 for lateral movement and skewing of platform 10. It will be recognized that rod 188 and tube 190 provide a telescopic connection to accommodate the linkage to the raising and lowering of frame 42 on the body frame 20. It will also be understood that the distance separating the free end of rod 188 and abutment 202 in tube 10 with which rod telescopes is sufficient to accommodate the necessary travel which occurs in raising and lowering frame 42. This distance is also so related to the related spacings of the spring 196 thereto and its tension that the spring will also be effective to rock the latches 156 and 156' about their pivotal mountings 158 when lever 162 is returned to its lock enforcing position of FIGURE 12 and whether frame 42 is in its raised or lowered position.

It is also a feature of the invention that before lowering platform 10 from its raised position as when it is ready to discharge bowl B in mixing machine M of FIGURE 16, the latches 156 and 156' must be set so that they will automatically lock the platform as soon as it is relieved of its load and is centered by springs 134. To provide for this a microswitch 204 (FIGURES 2 and 15) is supported on a bracket 206 affixed to the forward side of the operator booth wall 36. Said microswitch is provided with an operating arm 208 having a roller at its free end which engages link 168 so as to open and close in response to the shifting of link with operation of lever 162. In this manner microswitch 204 is interlocked with link 168 so that the cylinders 70 cannot be released of their pressurized fluid to effect lowering of the platform except when the control lever 162 has been set in its lock effective position which effectively moves link 168 to its position shown by phantom lines in FIGURE 15. In this position which is illustrated by FIGURE 12, latches 156 and 156′ are located so as to move into engagement with catch plate 150. However, if the platform is displaced slightly as will likely be the case, latch parts 160 cannot seat in notches 152 but will instead engage one or the other of aligning surfaces 154 of the catch plate depending on the direction of displacement of the carriages. Since said parts 160 are under the tension of spring 196, they will follow surfaces 154 as soon as the load on the platform 10 is relieved and drop into notches 152 as soon as springs 134 return the carriages to centered relation in their guideways 48 or 50 as the case may be.

From the aforesaid description of a preferred embodiment of the invention it will be readily appreciated that all the recited objects, features and advantages of the invention have been demonstrated as obtainable in an entirely satisfactory and highly practical manner. It will further be understood that many variations, rearrangement of parts and modifications thereof may be had within the spirit of the invention as defined by the appended claims.

Therefore having described my invention, I claim:

1. A lift truck comprising, in combination, a mobile base, an elevatable platform support carried by said base, means to elevate said platform support relative to the base, a platform mounted on said support for limited transverse and skewing horizontal movement relative to said support, resilient means mounted on and movable with said elevating means to counter said movement to maintain said platform centered on said support, and operator-controlled means for locking said platform in a centered position on said support.

2. A lift truck comprising, in combination, a wheel-supported main frame, an elevatable platform support mounted on said base, means for raising and lowering said platform relative to the main frame, a platform mounted on said support for limited transverse and skewing horizontal movement relative to said support, resilient means countering said movement to maintain said platform centered on said support, releasable means for locking said platform in a centered position on said support, operator-controlled means for actuating and de-actuating said releasable locking means and further means which inhibit operation of said elevating means to lower the platform support when said operator-controlled means is set to deactuate the locking means.

3. A lift truck comprising, in combination, a main body, an elevatable platform mounted on said body, elevating means operable to effect raising and lowering said platform support relative to said main body, a carriage slidably supported on said platform support for movement laterally of the platform support, and a platform mounted on said carriage, said carriage including a catch surface having a centering notch, latch means mounted on the platform support for movement between a remote position and a near position where the catch means resiliently engages said catch surface and so as to be disposed in said notch when the carriage is centered relative thereto, the latch means thereby releasably locking the carriage and platform against lateral movement on the platform support, operator-controlled means connected to said latch means for moving said latch to its remote position to permit lateral movement of the carriages and platform mounted thereon, and further means associated with said operator-controlled means which inhibit operation of the elevating means to lower the platform support when the latch is moved by said operator-controlled means to its position remote from the catch surface.

4. A lift truck comprising, in combination, a main body, an elevatable platform support mounted on said body, elevating means operable to raise said platform support to an elevated position and also to lower it to a low position on said body, a pair of carriages slidably supported on said platform support for movement laterally of the platform support, and a platform mounted on said carriages for skewing horizontal movement relative thereto, said carriages each including an abutment surface having a notch, a latch associated with each said abutment surfaces and adapted for adjustment between a near position in engagement with said abutment surface and a remote position out of engagement therewith, said latches being resiliently tensioned and adapted to lock the respective carriages against lateral movement when seated within said notches of the abutment surfaces, and operator-controlled means for moving said latches between their near and remote positions.

5. A lift truck comprising, in combination, a main body, an elevatable platform support mounted on said body, elevating means operable to raise said platform support to an elevated position and also to lower it to a low position on said body, a pair of carriages slidably supported on said platform support for movement laterally of the platform support, and a platform mounted on said carriages for skewing horizontal movement relative thereto, said carriages each including an abutment surface having a notch, a latch associated with each said abutment surfaces and adapted for adjustment between a near position in engagement with said abutment surface and a remote position out of engagement therewith, said latches being resiliently tensioned and adapted to lock the respective carriages against lateral movement when seated within said notches of the abutment surfaces, and further means associated with said latches which inhibit operation of the elevating means to lower the platform support when the latches are in their remote position.

6. A lift truck comprising, in combination, a mobile base, an elevatable platform support carried by said base, a pair of carriages slidably mounted on said support for movement laterally thereof, a platform supported on said carriages and pivotally connected to one of said carriages, said platform being connected to the other carriage for limited reciprocal movement relative thereto, and means for holding said platform in a centered position on said support.

7. A lift truck comprising, in combination, a mobile base, an elevatable platform support carried by said base, a pair of carriages slidably mounted on said support for movement laterally thereof, said carriages having rollers supported thereon free to turn on their axles through parallel planes disposed normal to the direction of movement of the carriages on the platform support, a platform supported on said rollers and pivotally connected to one of said carriages, said platform being connected to the other carriage for limited reciprocal movement relative thereto, resilient means countering said lateral movement of the carriage to maintain said platform centered on said support, and operator-controlled means for locking said platform in a centered position on said support.

8. A lift truck comprising, in combination, a mobile base, an elevatable platform support carried by said base, a pair of carriages slidably mounted on said support for movement laterally thereof, said carriages having rollers supported thereon free to turn on their axles through parallel planes disposed normal to the direction of movement of the carriages on the platform support, a platform supported on said rollers and pivotally connected to one of said carriages, said platform being connected to the other carriage for limited reciprocal movement relative thereto to accommodate skewing horizontal movement of the platform on the carriages, and resilient means countering said lateral movement of the carriages and urging said platform into a centered position on said support.

9. A lift truck comprising, in combination, a low-slung wheel-supported main body frame, an elevatable platform support overlying said main body frame and linked to said frame, elevating means connected between said main body frame and platform support and operable to raise said platform support from a position of rest on said main body frame to a raised position thereover, a forward located pair of U-shaped guideways fixed to said platform support and having top, bottom and side walls extending laterally of said support in spaced parallel relation with an open side facing each other, a rearward located pair of U-shaped guideways fixed on said support spaced from said forward located pair and having similarly disposed top, bottom and side walls extending laterally thereof in spaced parallel relation and with an open side disposed toward each other, a forward carriage and a rearward carriage respectively assembled with said forward and rearward located pair of guideways, each said carriages having rollers on their opposed sides which engage the bottom and side walls and beneath the top walls of the respective guideways with which they are assembled to permit free sliding movement of the carriages laterally of the platform support, each said carriages supporting further rollers freely turning on parallel horizontally disposed axles extending in directions normal to the direction in which the carriages are movable in said guideways, said further rollers extending above the carriages, and a platform resting on said spaced rollers, one of said carriages having a center-disposed upright pivot post about which the platform is connected for pivotal movement, the other of said carriages having a centrally located channel on its top side extending in a direction normal to the direction of movement of the carriage, and the platform having a roller on its underside slidingly engaging with the side walls of said channel to accommodate limited skewing of the platform about its connection with said pivot post, each said carriages further include an abutment portion depending from its underside, compressible spring means disposed on each side of said abutment portion and confined therebetween and a portion of the platform support so as to counter lateral movement of the carriages in their guides, said abutment portions each including a catch plate having a notch, and a pair of latches pivotally mounted on the platform support for movement into and out of engagement within said notches whereby to releasably lock said carriages against lateral movement, an operator-controlled lever mounted on said main body frame and linkage means connecting each said latches to said lever to permit moving said latches into and out of locking engagement within said notches of the catch plates on said carriages, and means operably associated with said latches which inhibit lowering of the platform support when the latches are out of position to effect unlocking of the latches.

References Cited

UNITED STATES PATENTS

| | | | |
|---|---|---|---|
| 2,042,382 | 5/1936 | Binkley | 214—83.24 |
| 2,828,040 | 3/1958 | Fitton et al. | 214—730 |
| 2,829,786 | 4/1958 | Bucher | 214—83.24 |
| 2,957,594 | 10/1960 | Brenneman | 214—620 |
| 3,149,583 | 9/1964 | Morrill | 104—49 |

FOREIGN PATENTS 1,072,243  3/1954  France.

GERALD M. FORLENZA, *Primary Examiner.*

R. B. JOHNSON, *Assistant Examiner.*